United States Patent [19]

Urban et al.

[11] Patent Number: 4,704,537
[45] Date of Patent: Nov. 3, 1987

[54] PASSIVE DOSIMETER

[75] Inventors: Manfred Urban; Hans Kiefer, both of Leopoldshafen, Fed. Rep. of Germany

[73] Assignee: Kernforschungszentrum Karlsruhe GmbH, Karlsruhe, Fed. Rep. of Germany

[21] Appl. No.: 698,792

[22] Filed: Feb. 6, 1985

[30] Foreign Application Priority Data

Feb. 8, 1984 [DE] Fed. Rep. of Germany ....... 3404301

[51] Int. Cl.⁴ .............................................. G01V 5/00
[52] U.S. Cl. ............................... 250/472.1; 250/474.1; 250/253
[58] Field of Search ................... 250/472.1, 474.1, 253

[56] References Cited

U.S. PATENT DOCUMENTS 2,562,969 8/1951 Teichmann ........................ 250/472.1
4,385,236 5/1983 Hassib et al. ..................... 250/472.1
4,417,142 11/1983 Malmgvist et al. .................. 250/253
4,518,860 5/1985 Alter et al. ....................... 250/472.1

Primary Examiner—Janice A. Howell
Assistant Examiner—David Porta
Attorney, Agent, or Firm—Spencer & Frank

[57] ABSTRACT

In a passive dosimeter including a diffusion chamber having an interior space, and an alpha particle detector located within the chamber for producing an indication of the concentration of radon and thoron gas and decay products and the relative percentages of radon and thoron individually, the diffusion chamber is constructed so that the interior space is open to the outside, the size of the detector and of the interior space are selected for causing the differences in path length of alpha particles in the interior space to permit the emission energy to be determined independently of the location of decay events, and the surface of the chamber bordering the interior space is electrically conductive.

3 Claims, 3 Drawing Figures

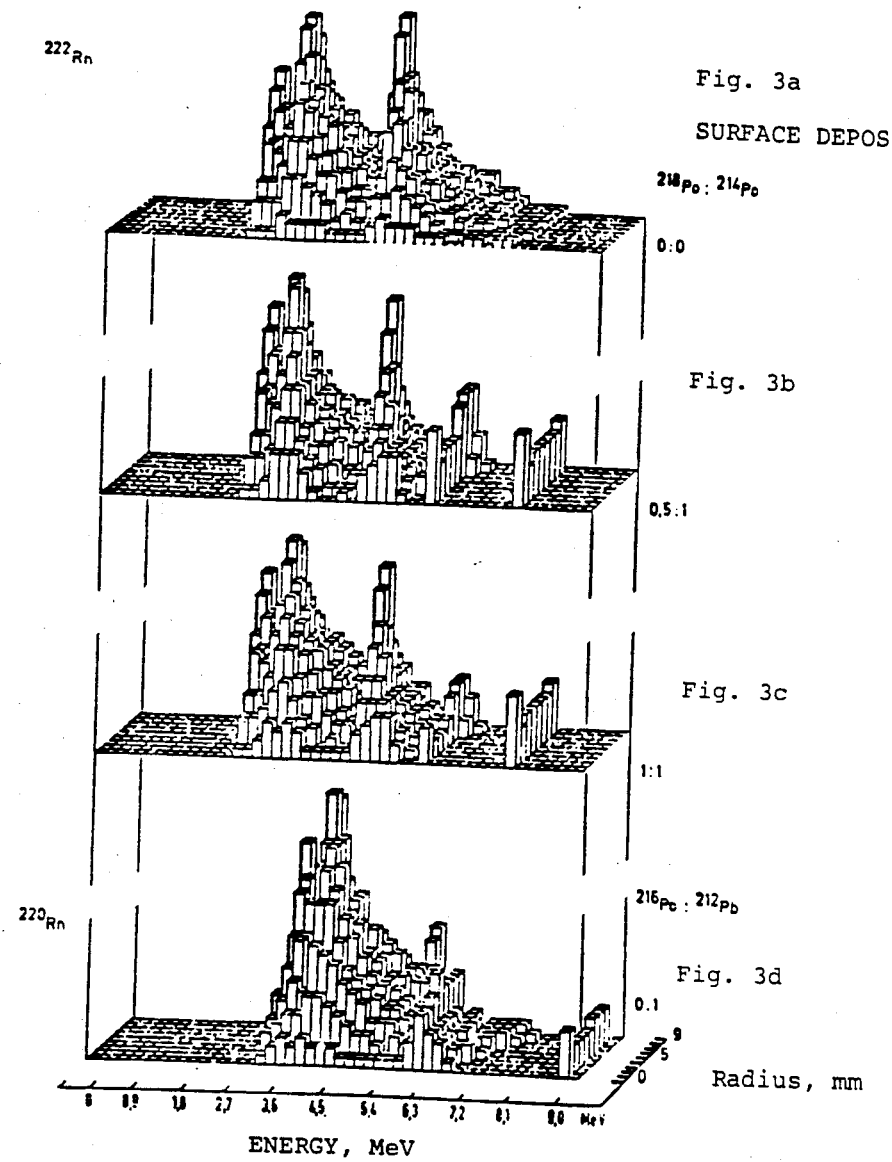

PASSIVE DOSIMETER

BACKGROUND OF THE INVENTION

The present invention relates to a passive dosimeter including a diffusion chamber in which is disposed a nuclear trace detector for alpha particles and with which the concentrations of radon and thoron gas and of their decay products as well as the percentages of radon and thoron individually can be detected.

The natural radiation exposure of a human being is determined by two radiation components: extraneous irradiation by cosmic rays and rays of the natural radionuclides of the environment; and internal irradiation by inhalation of natural radionuclides in the inhaled air and by ingestion in foods and drinking water. Civilization influences often lead to increases. The noble gas radon is responsible for a noticeable increase in the inhaled dosage. Radon has three isotopes having the mass numbers 222, 220 and 219. They are produced in the decay series of $U^{238}$, $Th^{232}$ and $U^{235}$. Their half-lives are 3.8 days, 56 seconds and 4 seconds, respectively: since natural uranium is composed of approximately 99% $U^{238}$ and only about 0.7% $U^{235}$, $Rn^{219}$ is of subordinate significance.

The concentration of radon ($Rn^{222}$), thoron ($Rn^{220}$) and their short-lived decay products in air is subject to considerable space and time fluctuations. In houses it depends on the radium content of the construction materials and on room ventilation. Part of the noble gases formed by the decay of $Ra^{226}$ and $Ra^{224}$, respectively, enters into the air by way of diffusion. The permeability of the construction materials here plays a significant part. Further sources may be water and noble gases as well as the geological subsoil. In the open air, there is the additional influence of meteorological parameters.

The radon concentration increases considerably with decreasing air exchange rate. Recent energy conservation measures have contributed to a steady reduction of air exchange rates in houses. The decay products of radon are heavy metals and are present in air as free atoms but primarily adsorbed at aerosols. By way of deposition on surfaces, there occurs a de-enrichment of the decay products so that a radioactive equilibrium between radon and its decay products is never reached in the air of living quarters. In the open air, an approximate equilibrium occurs only at some height above the ground.

The aerosol-type, short-lived decay products are generally never in equilibrium with radon or thoron, respectively, in air, due to their being deposited on surfaces. It is therefore appropriate to define an equilibrium factor F as follows:

$$F = \frac{c_{pFp}}{c_{pRn}}$$

where $c_{pFp}$ represents the potential alpha energy concentration of the short-lived decay products of radon and $c_{pRn}$ represents the potential alpha energy concentration of radon in equilibrium with its short-lived decay products.

If one compares the effective equivalent dose of the decay products with the effective equivalent dose of the noble gas radon, it becomes clear that the percentage of radon in the dose plays a part only in the range of equilibrium factors <0.1. Short-term measurements of the equilibrium factors in houses yielded values of between 0.1 and 0.8 with a median value of 0.3.

For thoron decay products only very few measurements of equilibrium factors, defined in a manner corresponding to F, above, in houses are available. These measurements cover a dispersion range from 0.01 to 0.5 with a frequency maximum at 0.05. Due to the low radioactive half-life of $Po^{216}$ (0.15 seconds), equilibrium with thoron (55 seconds) always exists. For that reason, $Po^{216}$ is treated together with thoron in the dose determination. In the dose determination for the decay products, the percentage of $Pb^{212}$ outweighs the percentage of $Bi^{212}$ by a factor of 10.

For the identical potential inhaled alpha energy, the dose for thoron decay products is only about ⅓ of the dose of radon decay products. Short-term measurements of the potential alpha energy concentration in about 100 houses produced a median value for radon decay products of $3.5 \cdot 10^{-8}$ $Jm^{-3}$, for thoron decay products a median value of $3.1 \cdot 10^{-8}$ $Jm^{-3}$. The measurements also indicated that in some houses the percentage of thoron decay products exceeds the percentage of radon decay products up to a factor of 2. For that reason, a realistic dose estimate in houses must also consider the percentage of thoron decay products.

Presently employed measuring methods can be divided into two groups: active and passive measuring methods. Active measuring methods require an external energy supply to operate; they operate primarily with pumps and electronic evaluation systems. Passive measuring methods operate without an energy supply, have no moving parts or electronic systems and primarily employ thermoluminescence detectors ($CaSO_4$:Dy, LiF) or solid state nuclear track detectors (cellulose nitrate, polycarbonate) as their detectors.

A major drawback of the thermoluminescence detectors (TLD) is their comparatively low sensitivity to alpha particles compared to their sensitivity to beta and gamma radiation. Since the number of recorded alpha particles is significant for the evaluation, a second, shielded TLD must be employed for the difference formation. Solid state nuclear track detectors used for radon dosimeters are primarily cellulose nitrate foils as well as polycarbonate foils (MAKROFOL, LEXAN, CR 39). These detectors are insensitive to beta and gamma radiation.

In principle, there are two types of radon dosimeters: diffusion chambers and the so-called open detectors. Diffusion chambers are composed of a vessel closed by a filter with a detector in its interior. Radon diffuses through the filter into the interior of the vessel; radon decay products contained in the air are retained by the filter. The detector records the alpha particles of the radon decay and of the decays of the decay products produced in the dosimeter.

This method has been used for several years and is distinguished by good reproducibility of the measuring results. Frequently, open detectors are employed to obtain statements about the radon concentration in the air. A detector without housing is exposed and records all alpha particles of a certain volume range and the alpha particles of radon decay products deposited on its surface. Generally, this provides information only about the gross alpha activity without nuclide specific separation, if the equilibrium state between radon and its decay products in the air is not known. Information about the percentages of radon, thoron or their decay products can be obtained only by separate evaluation of certain alpha energy groups. Radon alone can be determined very easily by means of a diffusion chamber. A diffusion resistor permits quantitative separation of thoron due to its short half-life compared to radon. Thoron can be measured in a diffusion chamber only together with radon. A measurement of the thoron concentration is therefore a difference measurement. It would be advantageous to find a suitable filter material which permits thoron to diffuse through in large amounts but simultaneously retains decay product aerosols. A mathematical model for such a diffusion chamber would have to consider the diffusion process of radon and thoron through the filter into the interior of the chamber, the separation of decay products and aerosols by the filter and the diffusion process and surface deposition of the decay products produced in the chamber.

SUMMARY OF THE INVENTION

It is therefore an object of the present invention to provide a dosimeter of the above-mentioned type with which the noble gas concentration as well as the concentration of decay products and the equilibrium factor can be measured, with the percentages of radon and thoron being indicated separately and simultaneously.

The above and other objects are achieved, in a passive dosimeter comprising means defining a diffusion chamber having an interior space, and an alpha particle detector located within the chamber for producing an indication of the concentration of radon and thoron gas and decay products and the relative percentages of radon and thoron individually, in that, according to the invention: the means defining a diffusion chamber are constructed so that the interior space is open to the outside; the size of the detector and of the interior space are selected for causing the differences in path length of alpha particles in the interior space to permit the emission energy to be determined independently of the location of decay events; and the chamber comprises means rendering the surface of the chamber bordering the interior space electrically conductive.

In contradistinction to a diffusion chamber for the determination of the concentrations of radon and thoron, the open dosimeter according to the present invention is not terminated by a filter so as to permit the exchange of decay products and other aerosols between the ambient air and the interior of the dosimeter. Thus, the dosimeter records radon and thoron, as well as aerosol bound and free decay products.

The dosimeter records alpha particles without distinguishing between decay occurring at the interior walls of the dosimeter and in the interior volume of the dosimeter. The exchange of aerosols with the ambient air is decisively influenced by the concentration gradient between the dosimeter and the ambient air. The de-enrichment of aerosol concentration constantly taking place in the dosimeter by deposition on its surface is taken into consideration.

Moreover, the constantly occurring aerosol deposition of free decay products must also be considered. The free decay products produced due to desorption during the alpha decay of adsorbed decay products or decay products deposited on the surfaces are likewise considered. A hemispherical dosimeter, compared to an open detector which is not limited by a volume range, reaches approximately the maximum space angle range of $2\pi$ or 0.5, respectively. For that reason, compared to all comparable frustoconical dosimeters, a hemispherical dosimeter promises to furnish the greatest attainable sensitivity.

The present invention will therefore be described in greater detail with reference to a dosimeter having a hemispherical geometry as shown in FIGS. 1 to 3.

BRIEF DESCRIPTION OF THE DRAWINGS

FIG. 3a-3d are diagrams illustrating the operation of the embodiment of FIGS. 1 and 2.

DESCRIPTION OF THE PREFERRED EMBODIMENTS

On the basis of the above-stated realizations, a mathematical model was produced which is applicable for all possible dosimeter geometries. Input values for the model are the radon and thoron concentrations, the concentration of the decay products adsorbed at aerosols and the free decay products as well as aerosol data for the ambient air. The first part of the model considers the particle transportation process from the ambient air into the dosimeter and within the dosimeter. The result is the nuclide concentration in the volume area and the surface density of the nuclides deposited on the surfaces in the dosimeter. The second part of the model determines, by Monte Carlo simulation, the response probability of the individual energy classes at the locus of the detector for the alpha energies of the nuclides for both regions. Combination of both parts produces, as the output value of the model, the alpha energy spectrum of the solid state nuclear track detector.

In order to obtain the most sensitive possible dosimeter, the maximum space angle range covered by the detector was examined for various cylinders and frustoconical geometries. The result was that only a hemispherical dosimeter reaches approximately the maximum space angle of $2\pi$ and thus promises to have the greatest sensitivity. For that reason, this geometry was selected for the dosimeter according to preferred embodiments of the invention.

Figure 1:
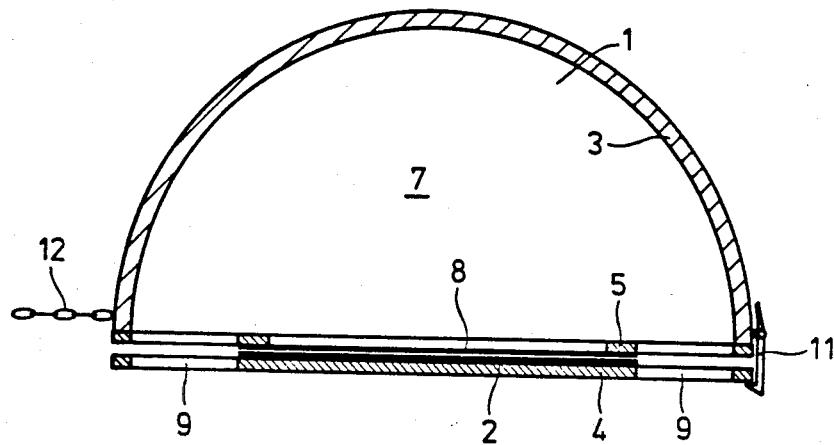
FIG. 1 is a cross-sectional view of a preferred embodiment of the invention.

FIG. 1 is a cross-sectional view of such a dosimeter 1 composed of a solid state nuclear track detector 2 in the form of a circular disc covered by a hemispherical body 3. Detector 2 lies between two metal or conductive plastic cover sheets 4 and 5 of the shape shown in FIG. 2. The inner portion 6 is closed in outer cover sheet 4 and open in inner cover sheet 5. However, with respect to the region 7 enclosed by hemisphere 3, solid state nuclear track detector 2 is covered by an electrically conductive sheet 8. The interior walls of hemisphere 3 and cover sheet 5, or at least surface layers thereof, are likewise electrically conductive. These measures serve to cause aerosols to be deposited on all interior faces of dosimeter 1 instead of only at certain points under the influence of static charges.

Figure 2:
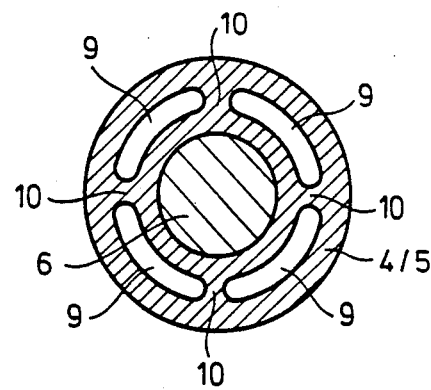
FIG. 2 is a plan view of components of the embodiment of FIG. 1.

The region between hemisphere 3 and solid state nuclear track detector 2 is primarily open. For this purpose, and to hold the solid state nuclear track detector 2 and sheet 8, slits 9 are provided in cover sheets 4 and 5, as shown in FIG. 2. These slits are interrupted by bars 10 having the smallest possible dimensions. Slits 9 permit unimpeded entrance of aerosols and gases into dosimeter 1, and specifically into region 7. The two cover sheets 4 and 5 are preferably held at hemisphere 3 means of clamps 11, one of which is shown in FIG. 1.

The preferred optimized dimension for the diameter of hemisphere 3 is 30 mm, for the diameter of portion 6 it is 18 mm, and for the radial width of slits 9 it is 4 mm. The entire dosimeter 1 may be worn by means of a chain 12 or the like.

The response probability of dosimeter 1 must be determined for all occurring alpha energies. A distinction must be made, in this connection, between decay taking place in the volume area 7 of dosimeter 1 and decay at a surface. In order to keep the mathematical model generally applicable for all conceivable dosimeter geometries and to avoid complicated integrations, the Monte Carlo method is employed. A stochastic model permits the determination of the response behavior in a simple way by means of a computer. To do this, alpha decay is simulated within a given geometry. A random number generator determines location and direction of alpha decay in dosimeter 1. Over the range of the simulated alpha energy in the air it is determined whether and with what residual energy the alpha particle impinges on detector 2. The ratio of the alpha particles reaching detector 2 to the number of simulated alpha decays is thus the desired response probability.

FIGS. 3a through 3d show calculated energy spectra as a function of the percentage of decay products deposited on the surfaces of the dosimeter, and thus illustrate—in addition to the surface deposition of $Po^{218}$-:$Po^{214}$—the determined response probabilities for 50 energy classes on nine concentric circular rings each 1 mm wide for hemispherical diffusion chamber 1 having a sphere radius of 15 mm, i.e., a diameter of 30 mm. In each of FIGS. 3a–3d, the energy spectrum extends horizontally, left to right, the radial location extends horizontally, front to back, from the center of detector 2, and the corresponding response probabilities extend vertically. For radon, FIG. 3a depicts the limit spectrum for no surface depositions of decay products, FIG. 3c shows the limit spectrum in the case of 100% surface depositions of decay products, and FIG. 3b shows a typical spectrum for a condition therebetween. For thoron, due to the short half-life of $Po^{216}$, its surface deposition is improbable, while $Pb^{212}$ and $Bi^{212}$, due to their relatively long half-lives, are deposited to 100% on surfaces. FIG. 3d shows the corresponding response probabilities for thoron.

By way of an electrochemical etching process, the tracks produced in detector 2 by alpha particles are enlarged. When the etching system was developed, particular emphasis was placed on its economical manipulation and its suitability for the evaluation of large series.

The diameter of a nuclear track is a measure for the energy of the alpha particle. The evaluation of detectors 2, i.e. the measurement of the nuclear track size spectrum, was automated with the aid of the image analysing device called Mikrovideomat II, made by Zeiss, Oberkochen, and with an HP 9835 table model computer. The size-energy association is effected by means of solid state nuclear track detectors which are irradiated with collimated alpha particles of various energies and are evaluated together with the dosimeter detector sheets 2 of a batch of dosemeters. When measuring the size spectra of these calibrated detectors, multiple nuclear tracks are separated by means of a correlation process, so as to prevent falsification of size-energy relationships. The concentration of radon, thoron and their short-lived decay products are calculated according to the minimum variance estimation method. The observation matrix is composed of the transformation matrix for nuclear track size-to-energy, the correction matrix for different detector efficiencies of individual alpha energies, and the system matrix of the mathematical model.

To test dosimeter 1, a small measuring series was performed in a total of 12 living quarters. The 50% distribution value for both noble gas isotopes lies at 50 $Bq/m^3$. The equilibrium factor averaged out over all 12 measurements is 0.3. The exposure periods lay in a range from 3 to 6 months. A second peak in the distribution curve at 0.7 indicates that nevertheless the general assumption of an average equilibrium factor of 0.3 can lead to considerable errors in the dose estimate for the individual case, with this peak being located in rooms in which the aerosol concentration was higher, i.e., because of the presence of smokers.

The dosimeter 1 according to the present invention offers a possibility for the first time to measure all dose relevant values, i.e. the concentration of the noble gas isotopes as well as the concentration of decay products in the air. This eliminates the primary uncertainty factor in dose determination, the suitable assumption of an average equilibrium factor between noble gas isotopes and their decay products. A conclusion regarding the emission energy of the alpha particles and thus regarding the nuclide becomes possible since the shape and size of dosimeter 1 define the space and surface region from which the alpha particles can be detected by detector 2 in such a way that the path length differences of the alpha particles are so small, independently of the location of decay in dosimeter 1, that the emission energy can be determined from their residual energy when they reach detector 2. The smaller the dimensions of dosimeter 1, the better becomes its energy resolution capability. In case of a hemispherical geometry the diameter of the sphere can vary from about 5 mm to 40 mm and the detector diameter from 5 to 35 mm. The overall sensitivity in terms of lowest detectable exposure decreases with decreasing volume of the dosemeter and decreasing diameter of the detector. Depending on which sensitivity is regarded to be sufficient the volume and the diameter of the detector have to be chosen within the limits which are given by the energy resolution capability. In principle any solid state nuclear track detector, which is suitable for electrochemical etching, can be applied. Practically at this time there are only Polycarbonate detectors as MAKROFOL or LEXAN and Alyldiglycolcarbonate detectors (CR 39) of interest.

It will be understood that the above description of the present invention is susceptible to various modifications, changes and adaptations, and the same are intended to be comprehended within the meaning and range of equivalents of the appended claims.

What is claimed is:

1. In a passive dosimeter comprising means defining a diffusion chamber having an interior space, and an alpha particle detector located within said chamber for producing an indication of the respective concentrations of radon and thoron gas and decay products and the relative percentages of radon and thoron individually, the improvement wherein:
   - said means defining a diffusion chamber are constructed so that said interior space is open to the outside;
   - the size of said detector and of said interior space are selected for causing the differences in path length of alpha particles in said interior space to permit the emission energy to be determined independently of the location of decay events; and said chamber comprises means rendering substantially entire the surface of said chamber bordering said interior space electrically conductive.

2. A dosimeter as defined in claim 1 wherein said means rendering the surface of said chamber electrically conductive comprises a sheet of electrically conductive material covering the side of said detector which is directed toward said interior space.

3. Passive dosimeter as defined in claim 2, wherein said diffusion chamber has a hemispherical portion and a flat portion, said detector is disposed on said flat portion and said chamber is provided with passage openings for noble gases and their decay products between said detector and said hemispherical portion.

* * * * *